(No Model.)

C. B. FULTON.
CLOTH CUTTING MACHINE.

No. 469,837.   Patented Mar. 1, 1892.

WITNESSES
O. D. Swett
John Cullen

INVENTOR
Chas. B. Fulton
by Herbert W. T. Jenner
Attorney

UNITED STATES PATENT OFFICE.

CHARLES B. FULTON, OF EDGEMONT, PENNSYLVANIA.

CLOTH-CUTTING MACHINE.

SPECIFICATION forming part of Letters Patent No. 469,837, dated March 1, 1892.

Application filed September 1, 1891. Serial No. 404,399. (No model.)

*To all whom it may concern:*

Be it known that I, CHARLES B. FULTON, a citizen of the United States, residing at Edgemont, in the county of Delaware and State of Pennsylvania, have invented certain new and useful Improvements in Machines for Cutting Butter-Cloth; and I do hereby declare the following to be a full, clear, and exact description of the invention, such as will enable others skilled in the art to which it appertains to make and use the same.

This invention relates to machines for cutting up thin cloth or muslin into pieces of convenient size to be used for wrapping up butter; and it consists in the novel construction and combination of the parts, as hereinafter fully described and claimed.

Figure 1:
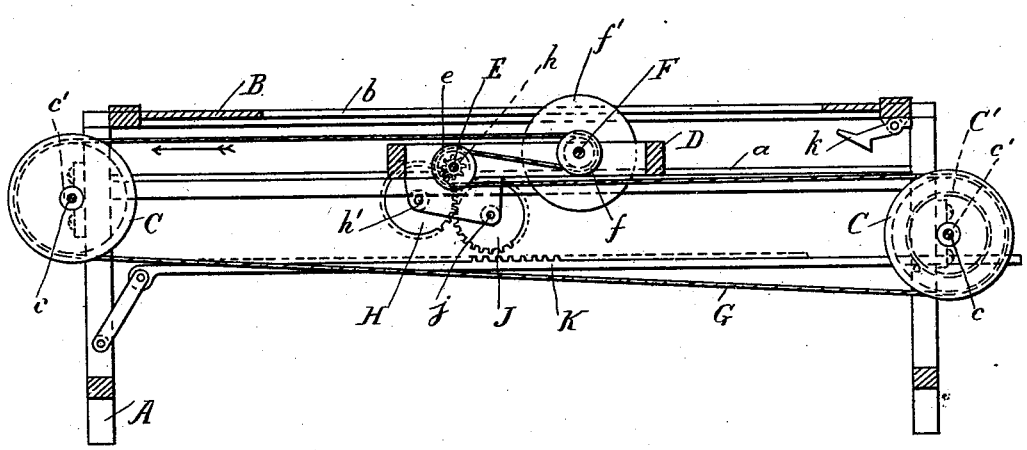
Figure 2:
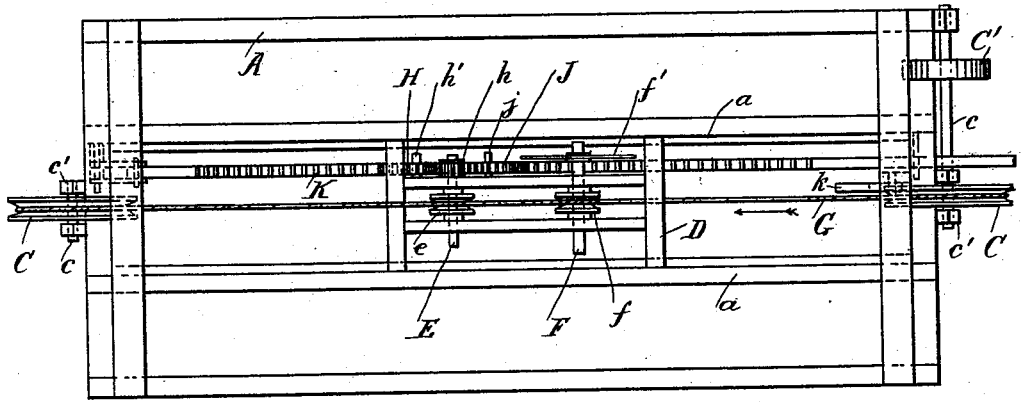

In the drawings, Figure 1 is a longitudinal section through the machine; and Fig. 2 is a plan view of the same from above, with the table removed.

A is the frame of the machine provided with longitudinal guides $a$.

B is the table secured to the frame above the guides and provided with a narrow longitudinal slot $b$.

C are driving-pulleys secured upon shafts $c$, which are journaled in bearings $c'$ at each end of the frame. One of the driving-shafts $c$ is provided with a belt-pulley $C'$ or with any other equivalent driving device for imparting rotary motion to it, either by hand or by power in any approved manner.

D is a carriage, which slides longitudinally in the guides $a$.

E is a shaft journaled in the lower part of the carriage D and having a pulley $e$, secured to it.

F is a second shaft journaled in the upper part of the carriage D, and this shaft has secured upon it a pulley $f$ and a circular cutter or knife $f'$.

G is an endless cord, which passes around the driving-pulleys C at the ends of the frame and is driven continuously in the direction of the arrow in the drawings. This cord passes under the pulley $e$ and from the upper side of the pulley $e$ to the under side of the pulley $f$ and thence onward around the driving-pulleys. The pulleys are shown grooved for the cord; but flat pulleys and an ordinary driving-belt, or chain-pulleys and an endless chain, or any other equivalent for the grooved pulleys and cord may be used.

The shafts E and F are journaled near the opposite ends of the frame D and at a considerable distance apart longitudinally. The shaft F is arranged only a little above the shaft E vertically. This construction permits of the use of only two cord-pulleys, and the weight of the rear end of the frame overcomes the natural tendency of that end to be lifted by the moving cord, and the cord is kept at a suitable driving-tension by the weight of the rear end of the frame.

The cutter $f'$ projects through the slot $b$ in the table and cuts through the folded cloth, which is laid upon the surface of the table in front of it. The cutter feeds itself automatically in the direction of the motion of the cord, and the speed of its longitudinal travel is controlled by the thickness of the layers of cloth through which it has to cut. The travel of the cutter and its carriage may be accelerated or retarded by hand, if desired.

The carriage may be returned to the front end of the machine by hand after it has cut through the cloth; but it is preferably returned automatically in the following manner: A toothed pinion $h$ is secured upon the end of the shaft E and gears into an idle toothed wheel H, journaled on the pin $h'$, projecting from the carriage D. A second toothed wheel J gears into the toothed wheel H and is journaled on the pin $j$, which also projects from the carriage D.

K is a toothed rack pivoted at one end to the frame A and adapted to be raised to place it in gear with the teeth of the wheel J. The use of the wheels H and J is to reduce the speed and to make the carriage move in the return direction. The carriage runs back automatically as soon as the rack is raised into gear with the wheel J.

A catch $k$ is pivoted at the front part of the machine and engages automatically with the carriage when it is returned by the rack, so that the rack may be lowered. The carriage then remains at the front end of the machine and does not commence to advance automatically until the catch is turned back to release it.

What I claim is—

The combination, with the frame provided with longitudinal guides and the cord-pulleys and driving-cord, of the sliding carriage provided with shafts, cord-pulleys, and a circular cutter, the two intergearing toothed wheels journaled on pins projecting from the carriage, the toothed driving-pinion secured on one of the said shafts and gearing into one of the said wheels, and a toothed rack supported by the frame and adapted to be raised vertically into gear with the other said toothed wheel, whereby the carriage may be returned to the front end of the machine, substantially as set forth.

In testimony whereof I affix my signature in presence of two witnesses.

CHARLES B. FULTON.

Witnesses:
EDGAR G. PEIRCE,
C. D. M. BROOMHALL.